(12) United States Patent
Javeed (10) Patent No.: US 11,455,199 B2
(45) Date of Patent: Sep. 27, 2022

(54) DETERMINATIONS OF WHETHER EVENTS ARE ANOMALOUS

(71) Applicant: MICRO FOCUS LLC, Santa Clara, CA (US)

(72) Inventor: Arshad Javeed, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 269 days.

(21) Appl. No.: 16/883,651

(22) Filed: May 26, 2020

(65) Prior Publication Data

US 2021/0373977 A1 Dec. 2, 2021

(51) Int. Cl.
G06F 9/54 (2006.01)
G06K 9/62 (2022.01)
G06N 7/00 (2006.01)
G06F 17/18 (2006.01)

(52) U.S. Cl.
CPC ............ *G06F 9/542* (2013.01); *G06F 17/18* (2013.01); *G06K 9/6219* (2013.01); *G06K 9/6223* (2013.01); *G06N 7/005* (2013.01)

(58) Field of Classification Search
CPC ....... G06F 9/542; G06F 17/18; G06K 9/6219; G06K 9/6223; G06N 7/005
See application file for complete search history.

(56) References Cited

U.S. PATENT DOCUMENTS

| | | | |
|---|---|---|---|
| 7,814,548 B2 | 10/2010 | Mukhopadhyay et al. | |
| 9,038,172 B2 | 5/2015 | Miller et al. | |
| 9,306,966 B2 | 4/2016 | Eskin et al. | |
| 9,317,686 B1 | 4/2016 | Ye et al. | |
| 9,990,511 B1 | 6/2018 | Dreyfus | |
| 10,326,672 B2 | 6/2019 | Scheib et al. | |
| 2009/0043797 A1* | 2/2009 | Dorie | G06F 16/355 707/999.102 |
| 2010/0226342 A1* | 9/2010 | Colling | H04W 56/002 370/336 |
| 2011/0055210 A1* | 3/2011 | Meredith | G06F 16/287 707/E17.046 |

(Continued)

OTHER PUBLICATIONS

Subaira.A.S, "A Study of Network Intrusion Detection by Applying Clustering Techniques", Oct. 2013, 8 pages. http://www.ijircce.com/upload/2013/october/22AStudy.pdf.

(Continued)

*Primary Examiner* — Tuan C Dao (57) ABSTRACT

According to examples, an apparatus may include a memory on which is stored instructions that when executed by a processor, cause the processor to cluster a set of data points into a hierarchy of a plurality of clusters, in which each level of the hierarchy includes a different number of the plurality of clusters. The processor may also select a number of the plurality of clusters to be used in modeling behaviors of the plurality of clusters and for each cluster of the selected number of the plurality of clusters, determine a distribution type of the cluster. The processor may further merge the distribution types of the clusters to generate a mixture model, identify an event, evaluate the event based on the generated mixture model to determine whether the event is likely anomalous, and based on a determination that the event is likely anomalous, execute a response action.

20 Claims, 5 Drawing Sheets

(56) References Cited

U.S. PATENT DOCUMENTS

| | | | |
|---|---|---|---|
| 2011/0137853 A1* | 6/2011 | Mackay | G06Q 10/06 |
| | | | 706/57 |
| 2014/0095425 A1* | 4/2014 | Sipple | G06N 5/02 |
| | | | 706/52 |
| 2016/0071017 A1* | 3/2016 | Adjaoute | G06Q 20/4016 |
| | | | 706/52 |
| 2017/0006135 A1* | 1/2017 | Siebel | G06N 20/00 |
| 2017/0154280 A1 | 6/2017 | Adir et al. | |
| 2019/0080089 A1 | 3/2019 | Chen | |

OTHER PUBLICATIONS

Wei Lu, et al., "Unsupervised Anomaly Detection Using an Evolutionary Extension of K Means Algorithm", Aug. 2001, 38 pages. https://www.researchgate.net/publication/228390063_Unsupervised_anomaly_detection_using_an_evolutionary_extension_of_k-means_algorithm.

* cited by examiner

DETERMINATIONS OF WHETHER EVENTS ARE ANOMALOUS

BACKGROUND

File systems may be systems that may manage how and where data is stored. Most file systems may be designed with file management as the main objective, which includes performance, encryption, etc. As a result, most file systems may be susceptible to attacks, such as the installation of malware, deletion of data, malicious encryption of data, and theft of data.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable mediums that may generate a mixture model that may model behaviors of clusters of data points. Particularly, the mixture model may be generated from clusters of data points, in which the number of data points may be reduced through implementation of a reducing algorithm. A suitable reducing and clustering algorithm may be a balanced iterative reducing and clustering using hierarchies (BIRCH) algorithm. In addition, a selected number of clusters to be used in modeling behaviors of the clusters of data points may be determined, in which the selected number of clusters may be an optimal number of clusters. The number of clusters may be selected through implementation of an iterative Kmeans operation and data identified in an elbow graph. The distribution types of the selected number of clusters may be determined, for instance, through implementation of an expectation-maximization process. The mixture model may also be generated based on the determined distribution types of the selected number of clusters.

As discussed herein, an event performed or to be performed on a file system may be identified and evaluated based on the generated mixture model to determine whether the event is likely anomalous. Based on a determination that the event is likely anomalous, a response action may be executed. The response action may be an action to block the event, output a notification, output a request for authentication to execute the event, and/or the like. As a result, through implementation of the features disclosed herein, A technical issue with file systems may be that the file systems may be susceptible to attacks, such as malware attacks, malicious encryption of data, malicious deletion of data, and/or the like. A technical solution disclosed herein may be that file systems may be better protected against such attacks, which may enable the data stored on the file systems to be accurate, reliable, and accessible. As attacks may be reduced or prevented through implementation of the features disclosed herein, the file system may have greater up time, which may increase the file system's usability and efficiency. Additionally, as discussed herein, the number of data points may be reduced and/or the number of clusters may be optimized, in which the processor may use the reduced number of data points and/or the optimized number of clusters in generating the mixture model. As the processor may thus generate the mixture model with the reduced number of data points and/or the optimized number of clusters, the processor may generate the mixture model using a reduced amount of resources.

Figure 1:
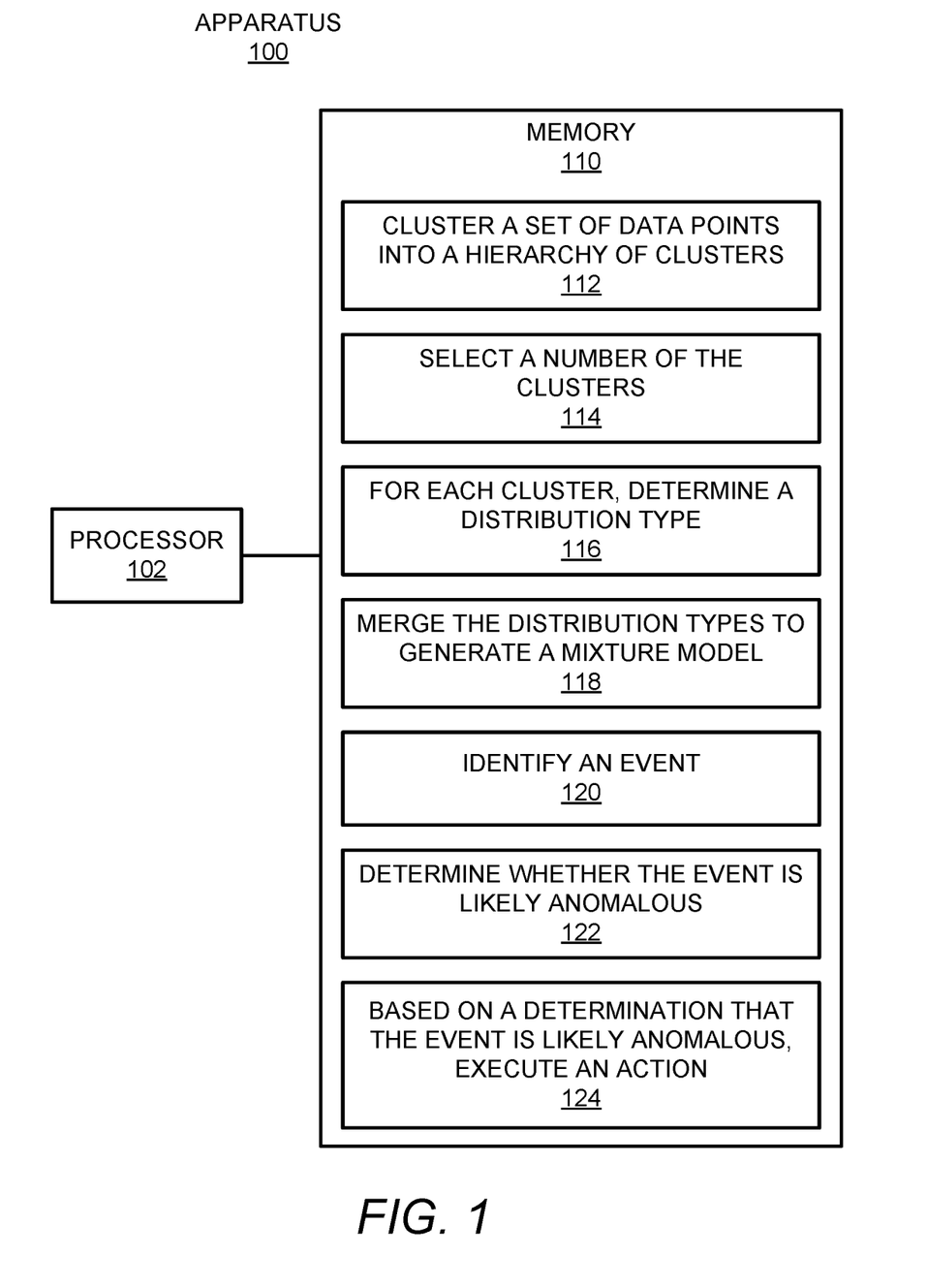
FIG. 1 shows a block diagram of an example apparatus that may determine whether an event, such as a user event on a file system, may likely be anomalous, and, based on a determination that the event may likely be anomalous, may execute a response action.
Figure 2:
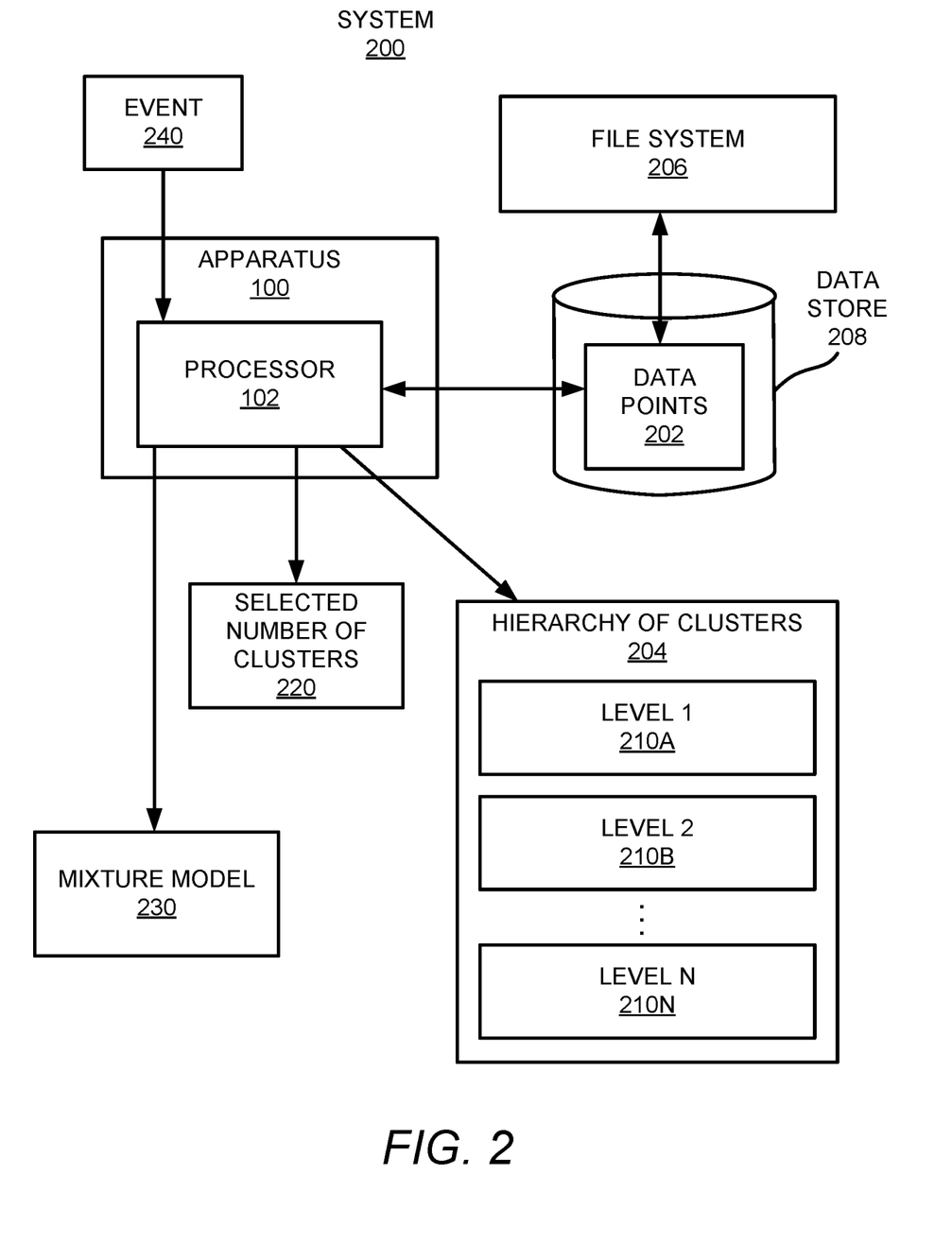
FIG. 2 shows a block diagram of an example system in which the example apparatus depicted in FIG. 1 may be implemented.

Reference is first made to FIGS. 1 and 2. FIG. 1 shows a block diagram of an example apparatus 100 that may determine whether an event, such as a user event on a file system, may likely be anomalous, and, based on a determination that the event may likely be anomalous, may execute a response action. FIG. 2 shows a block diagram of a system 200 in which the apparatus 100 depicted in FIG. 1 may be implemented. It should be understood that the example apparatus 100 depicted in FIG. 1 and/or the example system depicted in FIG. 2 may include additional features and that some of the features described herein may be removed and/or modified without departing from the scopes of the apparatus 100 and/or the system 200.

The apparatus 100 may be a computing system such as a server, a laptop computer, a tablet computer, a desktop computer, or the like. As shown, the apparatus 100 may include a processor 102, which may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions (which may equivalently be termed computer-readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer-readable storage medium, may be a non-transitory machine-readable storage medium, where the term "non-transitory" does not encompass transitory propagating signals.

As shown in FIG. 1, the memory 110 may have stored thereon machine-readable instructions 112-124 that the processor 102 may execute. Although the instructions 112-124 are described herein as being stored on the memory 110 and may thus include a set of machine-readable instructions, the apparatus 100 may include hardware logic blocks that may perform functions similar to the instructions 112-124. For instance, the processor 102 may include hardware components that may execute the instructions 112-124. In other examples, the apparatus 100 may include a combination of instructions and hardware logic blocks to implement or execute functions corresponding to the instructions 112-124. In any of these examples, the processor 102 may implement the hardware logic blocks and/or execute the instructions 112-124. As discussed herein, the apparatus 100 may also include additional instructions and/or hardware logic blocks such that the processor 102 may execute operations in addition to or in place of those discussed above with respect to FIG. 1.

With reference to FIGS. 1 and 2, the processor 102 may execute the instructions 112 to cluster a set of data points 202 into a hierarchy 204 of a plurality of clusters. According to examples, the set of data points 202 may be data points 202 of a file system 206, such as a system that may manage how and where data is stored, e.g., on a hard disk drive, a solid state disk drive, and/or the like. The file system 206 may manage operations, such as data storage management, file naming, directories/folders, metadata, access rules, privileges, etc. In these examples, the data points 202 may be various operations that the file system 206 may have performed and/or may have been performed on the file system 206. For instance, the data points 202 may include read operations, write operations, copy operations, encrypt operations, backup operations, and/or the like, on data, objects, files, and/or the like, on the file system 206. The data points 202 may additionally or alternatively include user access times, times at which particular users access particular files, file attributes, etc. The data points 202 may also include the dates and/or times at which the various operations were performed.

In some examples, the file system 206 may track the various operations that the file system 206 performs and/or are performed on the file system 206, as well as the times at which the various operations were performed. The file system 206 may also store the tracked various operations and the times at which the various operations were performed in a data store 208. In these examples, the processor 102 may access the data points 202 from the data store 208. In other examples, another device may track the data points 202 and may store that information in the data store 208. In addition, or alternatively, the processor 102 may access the data points 202 as the data points 202 are generated, e.g., as the file system 206 performs operations and/or operations are performed on the file system 206.

According to examples, the processor 102 may form a batch of the data points 202. For instance, the processor 102 may form the batch to have a certain size of the data points 202, to have data points 202 that were performed over a certain period of time, e.g., a certain number of days, a certain number of weeks, a certain number of months, etc., and/or the like. In some examples, the processor 102 may form the batch to include the data points 202 as the data points 202 are received by the processor 102. In other examples, the processor 102 may form the batch to include some or all of the data points 202 stored in the data store 208.

Generally speaking, the processor 102 may cluster the data points 202 by, for instance, grouping the data points 202 (or the batch of the data points 202) in such a way that the data points 202 in the same cluster are more similar in some respect to each other than to those data points 202 in other clusters or outside of the cluster. In addition, the processor 102 may cluster the data points 202 into a hierarchy 204 of clusters such that the number of clusters in each level 210A-210N of the hierarchy 204 differs, in which the variable "N" represents a value greater than one. That is, for instance, a first level 210A of the hierarchy 204 may include a smallest number of clusters and the last level 210N of the hierarchy 204 may include the largest number of clusters. In addition, the number of clusters may increase with an increase in the levels 210B to 210N-1.

The number of clusters in each of the levels 210A-210N may be based on the different numbers of properties that may be used to cluster (or equivalently, group) the data points 202. That is, for instance, a first number of properties may be used to cluster the data points 202 having similar features in the first level 210A of the hierarchy 204, a second number of properties may be used to cluster the data points 202 having similar features in the second level 210B, and so forth. As the first level 210A may include a cluster or clusters corresponding to a smaller number of properties, the first level 210A may include a smaller number of clusters than the second level 210B, which may include clusters corresponding to a larger number of properties. Additionally, the last level 210N may include the largest number of clusters among the levels 210A-210N.

As the number of data points 202 may be relatively large, the processor 102 may reduce the number of data points 202 and may cluster the reduced set of data points 202. According to examples, the processor 102 may apply a balanced iterative reducing and clustering using hierarchies (BIRCH) operation on the set of data points 202 to reduce the set of data points 202 and to cluster the reduced set of data points 202. For instance, the processor 102 may apply the BIRCH operation to treat the data points 202 as individual clusters in an initial iteration, in a second iteration, combine the data points 202 to their closest clusters, in a third iteration, combine the data points 202 further to their closest clusters, and so forth. By way of example, the processor 102 may combine some of the data points 202 by averaging values of some of the data points 202 and may treat the averaged values as clusters. In addition, the processor 102 may apply the BIRCH operation hierarchically, e.g., such that each level 210A-210N of the hierarchy includes increasing numbers of clusters (for instance as a CFTree). A result of the application of the BIRCH operation may be a hierarchical representation of a significantly reduced number of the data points 202.

The processor 102 may execute the instructions 114 to select a number of clusters 220 to be used in modeling behaviors of the clusters, e.g., of all of the clusters. The selected number of clusters 220 may correspond to an optimal number of the clusters to be used in modeling behaviors of the clusters. The optimal number of the clusters may be a number of the clusters that may enable the behaviors of the clusters to be modeled at or beyond a predefined accuracy level. The optimal number of clusters may also correspond to a number of the clusters that may enable the behaviors to be so modeled within a predefined length of time, within a predefined amount of resource consumption, within a predefined number of process iterations, and/or the like.

The processor 102 may approximate the number of clusters by analyzing specific levels 210A-210N of the hierarchy 204 of clusters. By way of particular examples, the processor 102 may use a particular branching factor, e.g., 50, 100, 200, or the like in applying the BIRCH operation. In these examples, whenever there are more than the particular branching number, e.g., 50, of data points 202 for a particular cluster, the processor 102 may split the cluster into two clusters. As a result, the BIRCH CFTree may have the particular branching factor ("B") and, each level ("L") 210A-210N of the hierarchy 204 (e.g., each level of the BIRCH CFTree) may have $B^L$ number of data points 202. In addition, analyzing a particular level "L" of the hierarchy 204 may involve working with, at most, $B^L$ number of data points 202. Increasing the number of data points 202 by moving down the hierarchy 204 (or equivalently, the BIRCH CFTree) may improve accuracy, but may also increase the amount of time and resources used to analyze the data points 202 because the number of data points 202 increase exponentially when moving down the hierarchy 204.

According to examples, with $B^L$ data points 202, the processor 102 may use an iterative Kmeans operation to select the number of clusters 220, e.g., the optimal number of clusters. Particularly, the processor 102 may use the iterative Kmeans operation to dynamically vary the number of clusters in the hierarchy 204 of clusters to select the number of the clusters 220 to be used in modeling the behaviors of the clusters. By way of example, to use the iterative Kmeans operation, the processor 102 may determine inertias of the clusters in the selected number of the plurality of clusters 220 as discussed herein with respect to FIG. 3, which depicts an example Elbow graph 300. Particularly, the processor 102 may use data represented in the Elbow graph 300 to select the number of clusters 220 to be used in modeling the behaviors of the clusters. The features depicted in FIG. 3 are also described with respect to FIG. 4, which depicts an example cluster graph 400.

Figure 3:
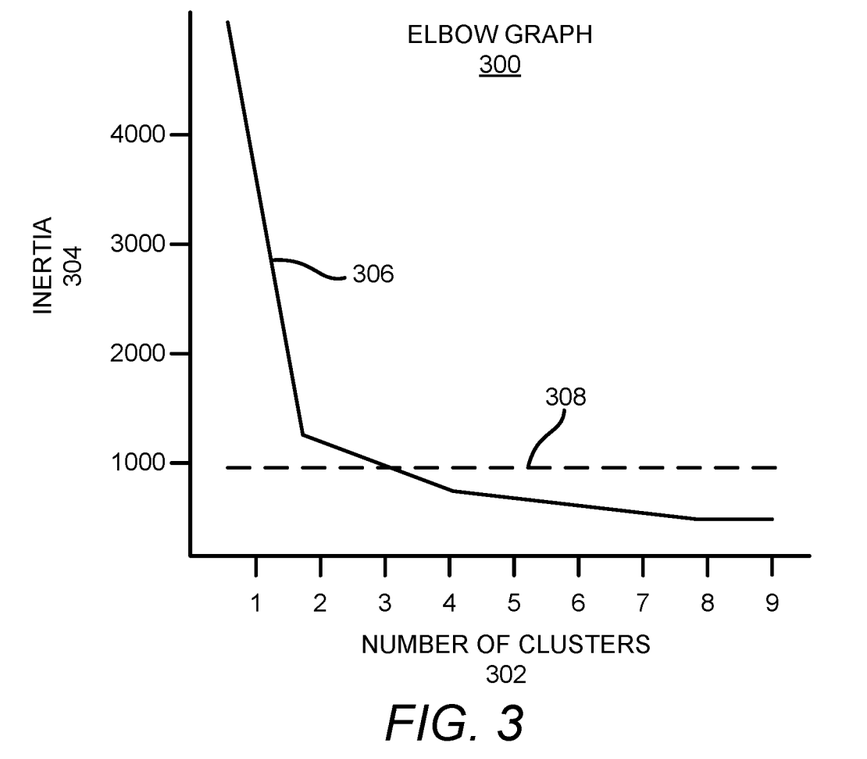
FIG. 3 depicts an example Elbow graph that may be employed to select a number of clusters to be used in modeling behaviors of clusters.

As shown in FIG. 3, the Elbow graph 300 may include a first axis (x-axis) that pertains to a number of clusters 302 and a second axis (y-axis) that pertains to inertias 304. The inertias 304 may be calculated as the summation of the sum of the square deltas (e.g., distances) of all of the data points 202 from the centroids of the cluster. Thus, for instance, and with reference to FIG. 4, the processor 102 may determine, for each of the clusters 402 and 404, the centroids 406 (which are marked with "x's") of the clusters 402 and 404 as well as the distances 408 of each of the data points 202 from the respective centroids 406 of the clusters 402 and 404. The processor 102 may also, for each of the clusters 402 and 404, determine the sum of the square distances 408 of the data points 202 from the centroid 406 and may add the sums of the clusters 402 and 404 together to determine the inertia 304 (e.g., the total inertia 304) corresponding to that number of clusters 302.

Figure 4:
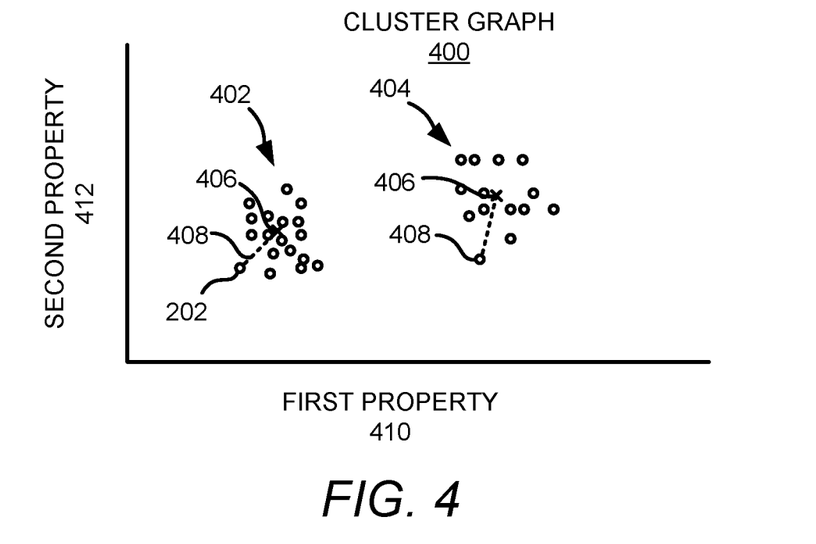
FIG. 4 shows an example cluster graph that depicts clusters of data points that may be used to generate the Elbow graph depicted in FIG. 3.

The clusters 402 and 404 may be determined through any of the manners discussed herein. Thus, for instance, the locations of the data points 202 in the cluster graph 400 may be determined based on a combination of a first property 410 and a second property 412. By way of non-limiting example, the first property 410 may be user access times, file transaction types, or the like, and the second property 412 may be user identifications, locations, or the like. In any regard, the data points 202 may be clustered based on their proximities to each other such that, for instance, similar data points 202 may be clustered together. In addition, prior to clustering the data points 202, the processor 102 may encode the data points 202 as numbers according to the types of the data points 202 to enhance visualizations of the distributions of the data points 202. For instance, a read operation may be encoded to have a value of "0", a write operation may be encoded to have a value of "1", a copy operation may be encoded to have a value of "2," and so forth.

Through application of the iterative Kmeans operation, and with reference to FIGS. 3 and 4, when K=1, the processor 102 may treat the entire set of data points 202 as a single cluster with the centroid 406 of the cluster being centrally located to the data points 202. The inertia 304 of the single cluster may be calculated by computing the sum of the squared distances of each of the data points 202 from the centroid 406. When K=2, the processor 102 may identify two clusters 402 and 404 and may identify two centroids 406 as discussed herein. The processor 102 may calculate a second inertia 304 of the two clusters 402, 404 by computing the sums of the squared distances of each of the data points 202 from the respective centroids 406 and adding the sums. As shown in FIG. 3, the second inertia 304 may be slightly lower than the inertia 304 resulting from the single cluster because the centroids 406 are closer to each of the respective data points 202 when there is more than one cluster.

When K=3, the processor 102 may identify three clusters and three centroids 406. The processor 102 may also calculate the inertia 304 corresponding to the three centroids 406, which may be lower than the previously calculated inertias 304. The processor 102 may identify further clusters, centroids 406, and inertias 304 corresponding to the further clusters. As shown in FIG. 3, a total inertia 304 may continue to decrease with each increase in the number of clusters because the sizes of the clusters may decrease and thus, the distances between the centroids 406 and their respective data points 202 may continue to decrease.

The processor 102 may graph a line 306 correlating the number of clusters 302 in each level of the hierarchy 204 and the determined inertias 304 of the clusters. The processor 102 may also calculate slopes along the line 306. As shown, the line 306 has multiple slopes, in which the slope of the line from one cluster to two clusters is relatively steep, the slope of the line from two clusters to four clusters is less steep, and the slopes following four clusters is even less steep. As denoted by the dashed line 308, the slope of the line 306 stops changing rapidly at around three clusters. Thus, in the example depicted in FIG. 3, the inertia 304 may stop changing rapidly when going from three to four clusters. The processor 102 may identify a point of the line 306 where a rate of change of the slope of the line 306 starts decreasing gradually or the point of the line 306 with a maximum curvature. The point may correspond to the location at which the dashed line 308 intersects the line 306. In addition, the processor 102 may determine the number of clusters corresponding to the identified point of the line 306 as the selected number of clusters 220 to be used in modeling behaviors of the plurality of clusters.

With reference back to FIG. 1, the processor 102 may execute the instructions 116 to, for each cluster of the selected number of clusters 220, determine a mean of the data points 202 in the cluster, determine a distribution type of the cluster. In some examples, the processor 102 may determine a mean and a variance of the data points 202 in the cluster and may determine the distribution type of the cluster based on the determined mean and variance of the cluster. The processor 102 may determine the mean and the variance of each of the clusters, e.g., by calculating the mean and the variance of the data points 202 in each of the clusters. In addition, or in other examples, the processor 102 may compute the centroid and the radius of each of the clusters of the selected number of clusters 220.

According to examples, the processor 102 may determine the centroid (C) of a cluster (i) using the following equation:

$$C_i = \frac{\sum_{j=1}^{M=B^L} S_j * 1[[S_j \in \text{cluster}_i]]}{\sum_{j=1}^{M=B^L} 1[[S_j \in \text{cluster}_i]]}$$ Equation (1)

Where,

M is the number of data points 202 considered;
B is the branching factor of the BIRCH Feature Tree;
$S_j$ is the centroid of the cluster j;
$1[[S_j \in \text{cluster}_i]]$ is an indicator function; and $$1[[S_j \in \text{cluster}_i]] = \begin{cases} 1 \text{ when } S_j \in \text{cluster}_j \\ 0 \text{ otherwise} \end{cases}$$

According to examples, the processor 102 may determine the radius (R) of a cluster (i) using the following equation:

$$R_i = \frac{1}{N_i}[SS_i - 2(S_i * C_i) + N_i C_i^2]$$ Equation (2)

Where, $N_i$ is the number of data points 202 under the cluster i;
$SS_i$ (vector) is the sum of squares of the data points 202 under cluster i (stored in a CFSubcluster Node. No additional computation may be required);
$S_i$ (vector) is the sum of of the samples under cluster i (stored in the CFSubcluster Node. No additional computation may be required);
$C_i$ (vector) is the centroid of the cluster i; and
denotes an element-wise multiplication of the vectors.

The mean and the variance (or equivalently, the centroid and radius) of each of the clusters may be approximate generalizations of the actual dimensions of the clusters. In other words, the mean and the variance may be a Gaussian mean and a Gaussian variance and may thus be inaccurate. To correct the Gaussian mean and the Gaussian variance, the processor 102 may compute weights of the Gaussian means and the Gaussian variances and may correct the variances by treating the previously computed means and variances as prior information. The processor 102 may compute the weights and may vary the variances using an expectation maximization (EM) algorithm.

An EM algorithm may be an iterative method to identify a maximum likelihood or a maximum a posteriori (MAP) estimates of parameters in statistical models, in which the model may depend on unobserved latent variables. The EM algorithm may alternate between performing an expectation step (E-step) and a maximization step (M-step). The E-step may involve computing the probabilities for each data point 202. For instance, the processor 102 may compute the probabilities using the following equation:

$$r_{zi} = \frac{\pi_i f_i(X_z; \mu_i, \text{cov}_i)}{\sum_{j=1}^{K} \pi_j f_j(X_z; \mu_j, \text{cov}_i)}$$ Equation (3)

Where, $r_{zi}$ is the probability/risk score of the sample $x_z$ for the cluster i;
$\pi_i$ is the weight of the cluster i;
$f_i$ is the Probability Density Function that models the cluster i (which may be determined by performing the Kolmogorov Lilliefors (KL) test);
K is the number of cluster (which may be determined from the Elbow method discussed herein);
$\mu_i$ the mean of the cluster i; and
$\text{cov}_i$ is the covariance matrix for the cluster i.

The M-step may involve updating the estimates of the Gaussian means and the Gaussian variances. The processor 102 may update the estimates through use of the following equations (4)-(7).

$$m_i = \Sigma_z r_{zi}$$ Equation (4)

Where, $m_i$ is the total responsibility of the cluster i.

$$\pi_i = \frac{m_i}{m}$$ Equation (5)

Where, $\pi_i$ is the updated weight for the cluster;
$m_i$ is the responsibility of the cluster i; and
$m = \Sigma_{j=1}^{K} m_j$.

$$\mu_i = \frac{1}{m_i} \Sigma_z r_{zi} X_i$$ Equation (6)

Where, $\mu_i$ is the updated mean for the cluster i;
$m_i$ is the responsibility (e.g., the total probability mass) of the cluster i; and
$x_z$ is the sample (e.g, the $z^{th}$ data point).

$$\text{cov}_i = \frac{1}{m_i} \Sigma_z r_{zi}(X_z - \mu_i)^T (X_z - \mu_i)$$ Equation (7)

Where, $\text{cov}_i$ is the updated covariance matrix for the cluster i.

The EM algorithm may alternate between performing an E-step and performing a M-step for a relatively large number of iterations until the updated estimates converge to accurate values for the mean and variance of the data points 202 in the clusters. In many instances, the EM algorithm may consume a large amount of time to converge. However, through implementation of the BIRCH operation disclosed herein to cluster data points 202, the number of iterations performed to reach convergence may be significantly reduced, e.g., between about 50-100 iterations, because the initial estimates may be relatively close to the accurate values.

The processor 102 may determine the distribution types of the clusters of the selected number of the clusters 220 or equivalently, the natures of the distribution types. For instance, prior to using the probability density function in Equation (4), the processor 102 may determine the natures of the distribution types. The processor 102 may determine the distribution types of the clusters of the selected number of the clusters 220 through use of the following equations.

$$\frac{T_n}{\sqrt{n}} > q_\alpha \qquad \text{Equation (8)}$$

Where, $T_n$ is the test statistic (which may be defined as a statistic used for hypothesis testing), defined below in Equation (9) and Equation (10);

n is the total number of data points; and $q_\alpha$ is the 1−α quantile of Kolmogorov Lilliefors test (KL test).

$$T_n = \sqrt{n}\,\text{supremum}_{t \in R} \sqrt{F_n(t) - \Phi_{\hat{\theta}}(t)} \sqrt{} \qquad \text{Equation (9)}$$

Where, $F_n(t)$ is the cumulative distribution of the data points under the cluster; and $\Phi_{\hat{\theta}}(t)$ is the cumulative distribution of the ideal distribution with parameters $\hat{\theta}$. The "ideal distribution" may be defined as a theoretical distribution which would have a cumulative distribution of $\Phi_{\hat{\theta}}$ if the distribution were generated using the estimated parameters $\hat{\theta}$.

$$T_n = \sqrt{n} \max_{i=1,\ldots n}\left\{\max\left(\left|\frac{i-1}{n} - \Phi_{\hat{\theta}}(x_i)\right|, \left|\frac{i}{n} - \Phi_{\hat{\theta}}(x_i)\right|\right)\right\} \qquad \text{Equation (10)}$$

Where, $T_n$ is the test statistic;

n is the number of samples;

i is the order, which may represent the $i^{th}$ smallest data point; and $\Phi_{\hat{\theta}}(t)$ is the cumulative distribution of the ideal distribution with parameters $\hat{\theta}$. i.e., either a Gaussian, Uniform, Exponential, or a Probability Density Function (PDF) of any other well-known distribution.

Through use of some or all of the Equations (8)-(10), the processor 102 may apply statistical testing using a plurality of distribution types to obtain a plurality of test statistics. In addition, the processor 102 may determine which of the plurality of test statistics are computed to exceed a predefined threshold value and may determine the distribution types of the plurality of clusters as the distribution types corresponding to the plurality of test statistics that exceed the predefined threshold value, for instance, as determined via Equation (8). The distribution types of the clusters may include, for include, for instance, Gaussian distribution type, uniform distribution type, exponential distribution type, lambda distribution type, or the like. In other examples in which a particular cluster is modeled using an algorithm other than a Gaussian distribution, Equations (4)-(7) may be modified according to the type of algorithm used.

The processor 102 may execute the instructions 118 to merge the distribution types of the clusters to generate a mixture model 230. The processor 102 may generate the mixture model by modeling each of the clusters determined in the number of clusters 220 and may use the prior knowledge to run through the Expectation-Maximization algorithm. The processor 102 may also combine the probability models of the clusters. The processor 102 may model each of the individual clusters using a multivariate distribution such as a Gaussian or by applying the Equations (8)-(10) on each of the dimensions and obtaining a joint probability distribution of the cluster for more accurate results. The Expectation-Maximization algorithm involves two steps, (i) E-step or the Expectation step where the risk score or a probability score is computed for each of the data points given the model parameters (Equation (3)), (ii) the M-step or the Maximization step involves updating the mixture model parameters (Equations (4)-(7)) using the probabilities computed in the E-step. The processor 102 may repeat the E-step and M-step for a number of predefined iterations, until convergence. In one regard, because the mixture model generator 230 may make use of the prior knowledge (means and variances) obtained from the BIRCH tree (Equations (1)-(2)), and may run on a limited set of representatives, the process may converge significantly faster than without such prior knowledge.

The processor 102 may merge the determined distribution types to balance out the individual distribution types of the clusters and to treat the entire set of data points 202 as a combination of the determined distribution types of the clusters. The mixture model 230 may thus model the behaviors of the selected number of the clusters and thus the data points 202 (or a reduced set of the data points 202). In other words, the mixture model 230 may model normal and/or ideal behaviors of the selected number of the clusters.

The processor 102 may execute the instructions 120 to identify an event 240. The event 240 may be an operation that is to occur or has occurred on the file system 206. Thus, for instance, the event 240 may be a user access to files on the file system 206, a request to delete data on the file system 206, and/or the like. The processor 102 may identify the event 240 through receipt of an instruction from a user to access and/or interact with the file system 206.

The processor 102 may execute the instructions 122 to determine whether the event 240 is likely anomalous. Particularly, for instance, the processor 102 may calculate a joint probability (or equivalently, a score (s)) and may determine whether the event 240 is likely anomalous based on the calculated joint probability. The processor 102 may determine the probability (e.g., the Maximum Likelihood Estimator) through use of the following equation:

$$\sigma^{\wedge 2} = \frac{1}{n}\Sigma_i X_i^2 - \frac{1}{n}[\Sigma_i X_i]^2 \qquad \text{Equation (11)}$$

Where, $\sigma^{\wedge 2}$ is the Maximum Likelihood Estimator for the variance of the Gaussian;

n is the number of samples; and $x_i$ represents the sample.

The processor 102 may classify the event 240 as likely being anomalous when, for instance, the value of a probability/risk score (r) of the event 240 is less than a threshold. By way of example, the threshold may be (0.5*max_s).

The processor 102 may execute the instructions 124 to, based on a determination that the event 240 is likely anomalous, the processor 102 may execute a response action. The response action may include, for instance, backing up a file to a hidden store that may be password protected, blocking the requested operation in the event 240, outputting a notification, outputting a request for authentication to execute the response action, and/or the like. However, based on a determination that the event 240 is not likely anomalous, the processor 102 may permit the event 240 to occur, may not output a notification, and/or the like.

According to examples, the processor 102 may not determine the number of the plurality of clusters to be used in modeling behaviors of the clusters for additional incoming batches of data points 202, for instance, as additional data points 202 are generated. Instead, the processor 102 may use the previously selected number of clusters 220 and the processor 102 may update the BIRCH CFTree and parameters of existing Gaussian means and variances by computing weights and correcting variances as discussed herein.

Although the apparatus 100 is depicted as having a single processor 102, it should be understood that the apparatus 100 may include additional processors and/ores cores without departing from a scope of the apparatus 100. In this regard, references to a single processor 102 as well as to a single memory 110 may be understood to additionally or alternatively pertain to multiple processors 102 and multiple memories 110. In addition, or alternatively, the processor 102 and the memory 110 may be integrated into a single component, e.g., an integrated circuit on which both the processor 102 and the memory 110 may be provided.

Figure 5:
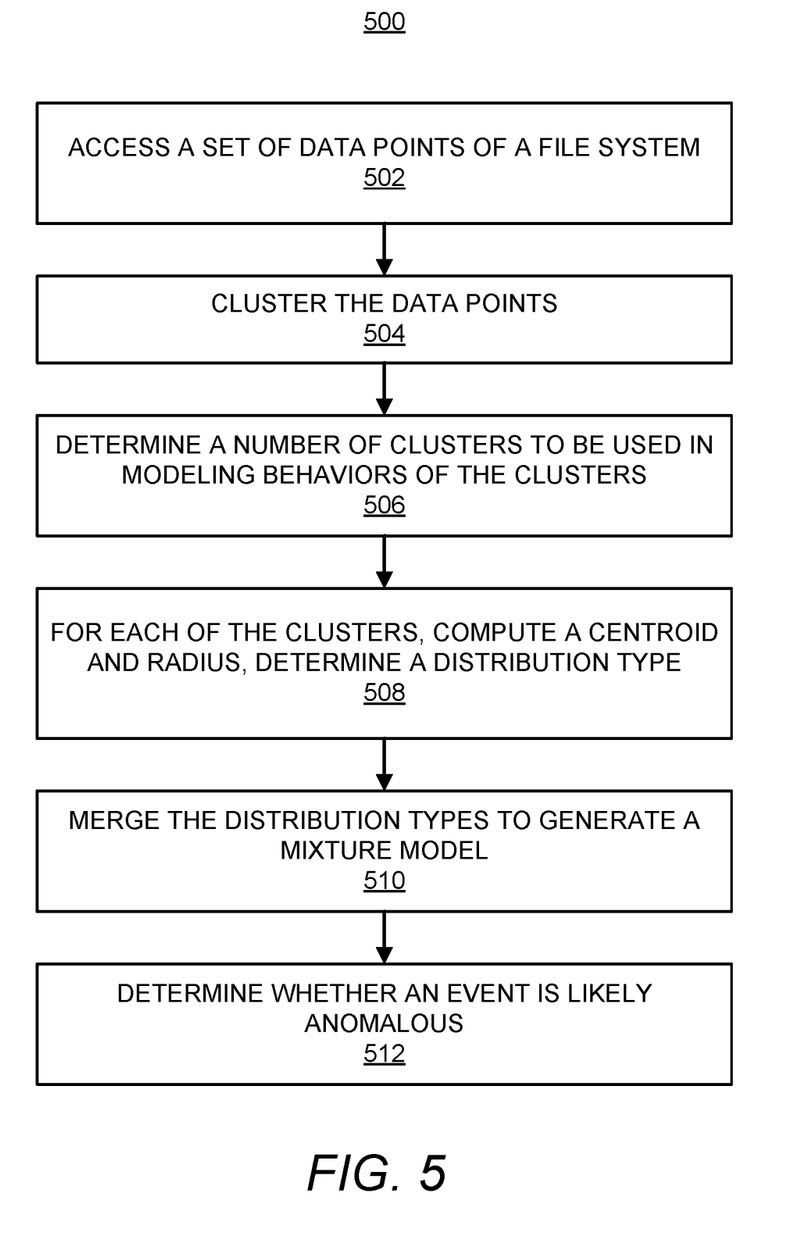
FIG. 5 depicts a flow diagram of an example method for determining whether an event is likely anomalous based on an evaluation of the event against a generated mixture model.

Turning now to FIG. 5, there is shown a flow diagram of an example method 500 for determining whether an event 240 is likely anomalous based on an evaluation of the event 240 against a generated mixture model 230. It should be understood that the method 500 depicted in FIG. 5 may include additional operations and that some of the operations described therein may be removed and/or modified without departing from the scope of the method 500. The description of the method 500 is also made with reference to the features depicted in FIGS. 1-3 for purposes of illustration. Particularly, the processor 102 depicted in FIGS. 1 and 2 may execute some or all of the operations included in the method 500.

At block 502, the processor 102 may access a set of data points 202 of a file system 206. At block 504, the processor 102 may cluster the data points 202 to assign the data points 202 in the set of data points to a plurality of clusters. For instance, the processor 102 may apply a balanced iterative reducing and clustering using hierarchies (BIRCH) operation on the set of data points to reduce the set of data points and to cluster the reduced set of data points as discussed herein.

At block 506, the processor 102 may determine a number of clusters in the plurality of clusters to be used in modeling behaviors of the plurality of clusters. The processor 102 may determine the number of clusters, e.g., the optimum number of clusters, in any of the manners discussed herein. In addition, at block 508, the processor 102 may, for each of the clusters in the determined number of the clusters, compute a centroid and a radius of the cluster and determine a distribution type of the cluster based on the computed centroid and the radius of the cluster, in any of the manners discussed herein.

At block 510, the processor 102 may merge the distribution types of the clusters to generate a mixture model 230 as discussed herein. In addition, at block 512, the processor 102 may determine whether an event 240 is likely anomalous based on an evaluation of the event 240 against the generated mixture model 230 in manners as also discussed herein.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 6:
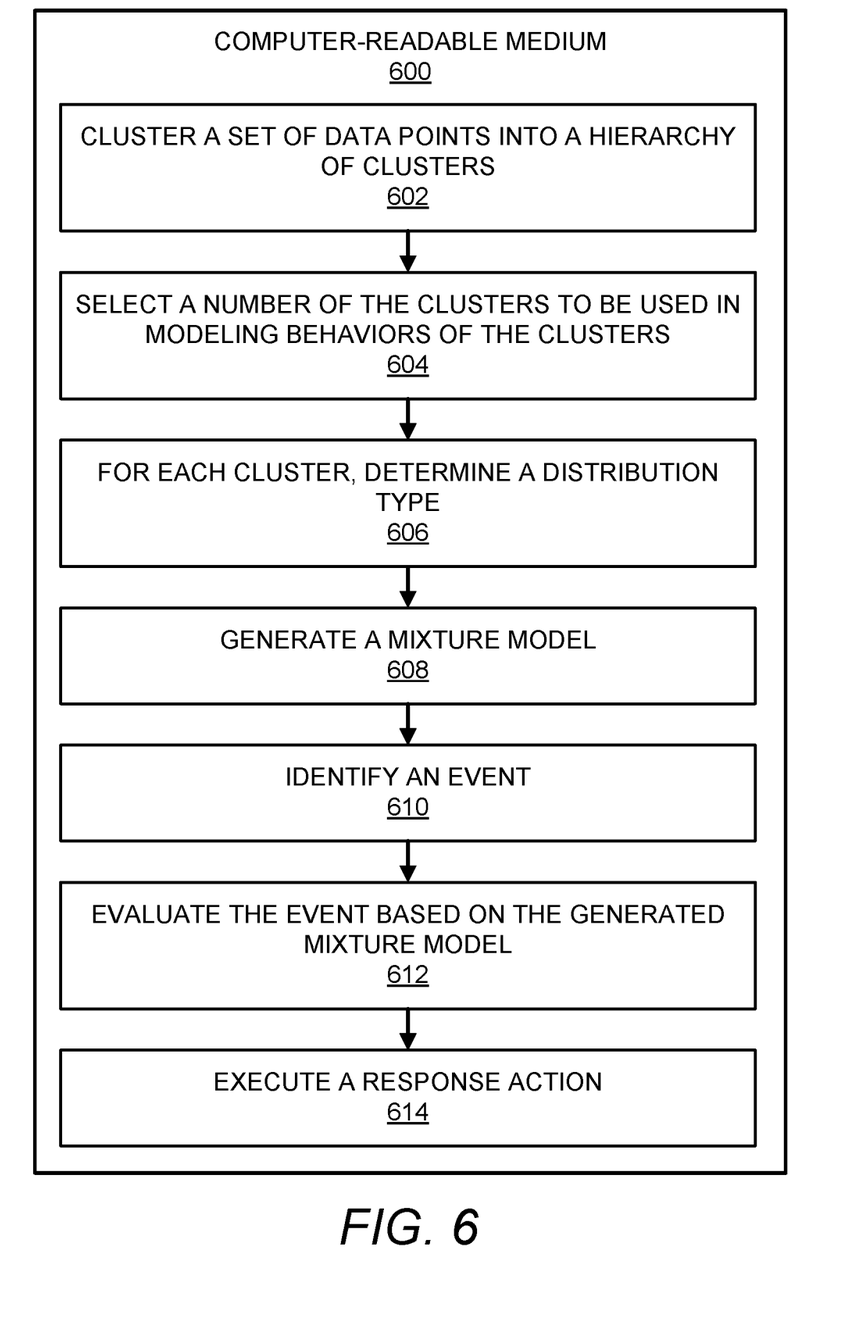
FIG. 6 shows a block diagram of an example computer-readable medium that may have stored thereon computer-readable instructions for determining whether an event is likely anomalous based on an evaluation of the event based on a generated mixture model.

Turning now to FIG. 6, there is shown a block diagram of an example computer-readable medium 600 that may have stored thereon computer-readable instructions for determining whether an event 240 is likely anomalous based on an evaluation of the event 240 based on a generated mixture model 230. It should be understood that the example computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium, in which the term "non-transitory" does not encompass transitory propagating signals.

The computer-readable medium 600 may have stored thereon machine-readable instructions 602-614 that a processor, such as the processor 102 depicted in FIG. 1, may execute. The computer-readable medium 600 may be an electronic, magnetic, optical, or other physical storage device that contains or stores executable instructions. The computer-readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to cluster a set of data points 202 into a hierarchy 204 of a plurality of clusters, in which each level 210A-210N of the hierarchy 204 includes a different number of the plurality of clusters. As discussed herein, the processor may apply a BIRCH operation on the set of data points 202 to reduce the set of data points to a reduced set of data points, in which the processor may cluster the reduced set of data points into the hierarchy 204. The processor may also determine the hierarchy 204 of the clusters with branching factors having particular levels 210A-210N, in which the number of the plurality of clusters and the data points 202 increases by moving down the particular levels.

The processor may fetch, decode, and execute the instructions 604 to select a number of the plurality of clusters 220 to be used in modeling behaviors of the plurality of clusters. As discussed herein, the processor may use an iterative Kmeans operation to dynamically vary the number of clusters in the hierarchy 204 of the clusters to select the number of the plurality of clusters 220 to be used in modeling the behaviors of the clusters.

The processor may fetch, decode, and execute the instructions 606, for each cluster of the selected number of the plurality of clusters, determine a distribution type of the cluster. The processor may determine the distribution type of the cluster in any of the manners discussed herein. The processor may fetch, decode, and execute the instructions 608 to merge the distribution types of the clusters to generate a mixture model 230. As discussed herein, the processor may apply an expectation maximization operation onto the distribution types of the clusters to generate the mixture model 230.

The processor may fetch, decode, and execute the instructions 610 to identify an event 240 and may fetch, decode, and execute the instructions 612 to evaluate the event 240 based on the generated mixture model 230 to determine whether the event 240 is likely anomalous. Moreover, the processor may fetch, decode, and execute the instructions 614 to, based on a determination that the event 240 is likely anomalous, execute a response action.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored instructions that when executed by the processor, cause the processor to:
cluster a set of data points into a hierarchy of a plurality of clusters, wherein each level of the hierarchy includes a different number of the plurality of clusters;
select a number of the plurality of clusters to be used in modeling behaviors of the plurality of clusters;
for each cluster of the selected number of the plurality of clusters, determine a distribution type of the cluster;
merge the distribution types of the clusters to generate a mixture model;
identify an event;
evaluate the event based on the generated mixture model to determine whether the event is likely anomalous; and
based on a determination that the event is likely anomalous, execute a response action.

2. The apparatus of claim 1, wherein the instructions further cause the processor to:
apply a balanced iterative reducing and clustering using hierarchies (BIRCH) operation on the set of data points to reduce the set of data points and to cluster the reduced set of data points.

3. The apparatus of claim 2, wherein the instructions further cause the processor to:
applying the BIRCH operation to determine the hierarchy of the clusters with branching factors having particular levels, wherein the number of the plurality of clusters and the data points increases by moving down the particular levels.

4. The apparatus of claim 3, wherein the instructions further cause the processor to:
use an iterative Kmeans operation to dynamically vary the number of clusters in the hierarchy of the clusters to select the number of the plurality of clusters to be used in modeling the behaviors of the clusters.

5. The apparatus of claim 4, wherein to use the iterative Kmeans operation, the instructions further cause the processor to:
determine inertias of the clusters in the selected number of the plurality of clusters;
graph a line correlating the selected number of the plurality of clusters in each level of the hierarchy and the determined inertias of the clusters;
calculate slopes of the line;
identify a point of the line where a rate of change of a slope of the calculated slopes of the line that starts decreasing gradually or the point of the line with a maximum curvature; and
determine the number of clusters corresponding to the identified point of the line as the selected number of the plurality of clusters to be used in modeling behaviors of the plurality of clusters.

6. The apparatus of claim 1, wherein the instructions further cause the processor to:
compute weights of the distributions and correct variances using an expectation maximization algorithm.

7. The apparatus of claim 1, wherein the instructions further cause the processor to:
apply statistical testing using a plurality of distribution types to obtain a plurality of test statistics;
determine which of the plurality of test statistics are computed to exceed a predefined threshold value; and
determine the distribution types of the plurality of clusters as the distribution types corresponding to the plurality of test statistics that exceed the predefined threshold value.

8. The apparatus of claim 1, wherein the instructions further cause the processor to:
block the event, output a notification, and/or output a request for authentication to execute the response action.

9. A method comprising:
accessing, by a processor, a set of data points of a file system;
clustering, by the processor, the data points to assign the data points in the set of data points to a plurality of clusters;
determining, by the processor, a number of clusters in the plurality of clusters to be used in modeling behaviors of the plurality of clusters;
for each of the clusters in the determined number of the clusters,
computing, by the processor, a centroid and a radius of the cluster;
determining, by the processor, a distribution type of the cluster based on the computed centroid and the radius of the cluster;
merging, by the processor, the distribution types of the clusters to generate a mixture model; and
determining, by the processor, whether an event is likely anomalous based on an evaluation of the event against the generated mixture model.

10. The method of claim 9, wherein clustering the set of data points comprises applying a balanced iterative reducing and clustering using hierarchies (BIRCH) operation on the set of data points to reduce the set of data points and to cluster the reduced set of data points.

11. The method of claim 10, wherein applying the BIRCH operation comprises applying the BIRCH operation to determine a tree of numbers of the clusters with branching factors having particular levels, wherein a number of the clusters and the data points increases by moving down the particular levels of the tree.

12. The method of claim 11, further comprising:
using an iterative Kmeans operation to dynamically vary the number of clusters on the tree of numbers of the clusters to determine the number of clusters in the plurality of clusters to be used in modeling the behaviors of the clusters.

13. The method of claim 12, wherein using the iterative Kmeans operation further comprises:
determining inertias of the clusters in the determined number of the plurality of clusters;
graphing a line correlating the selected number of the plurality of clusters in each of the particular levels and the determined inertias of the clusters;
calculating slopes of the line;
identifying a point of the line where a rate of change of a slope of the calculated slopes of the line that starts decreasing gradually or the point of the line with a maximum curvature; and
determining the number of clusters corresponding to the identified point of the line as the determined number of the plurality of clusters to be used in modeling behaviors of the plurality of clusters.

14. The method of claim 9, further comprising:
for each of the clusters in the determined number of the clusters,
applying a probabilistic model to determine the distribution type of the cluster.

15. The method of claim 9, wherein the distribution types of the clusters comprise a Gaussian distribution type, an exponential distribution type, a uniform distribution type, and/or a lambda distribution type.

16. The method of claim 9, wherein merging the distribution types of the clusters further comprises applying an expectation maximization operation onto the distribution types of the clusters to generate the mixture model.

17. The method of claim 9, further comprising:
applying statistical testing using a plurality of distribution types to obtain a plurality of test statistics;
determine which of the plurality of test statistics are computed to exceed a predefined threshold value; and
determine the distribution types of the plurality of clusters as the distribution types corresponding to the plurality of test statistics that exceed the predefined threshold value.

18. A non-transitory computer-readable medium on which is stored computer-readable instructions that when executed by a processor, cause the processor to:
cluster a set of data points into a hierarchy of a plurality of clusters, wherein each level of the hierarchy includes a different number of the plurality of clusters;
select a number of the plurality of clusters to be used in modeling behaviors of the plurality of clusters;
for each cluster of the selected number of the plurality of clusters, determine a distribution type of the cluster;
merge the distribution types of the clusters to generate a mixture model;
identify an event;
evaluate the event based on the generated mixture model to determine whether the event is likely anomalous; and
based on a determination that the event is likely anomalous, execute a response action.

19. The non-transitory computer-readable medium of claim 18, wherein the instructions further cause the processor to:
apply a balanced iterative reducing and clustering using hierarchies (BIRCH) operation on the set of data points to reduce the set of data points to a reduced set of data points, wherein the processor is to cluster the reduced set of data points into the hierarchy;
determine the hierarchy of the clusters with branching factors having particular levels, wherein the number of the plurality of clusters and the data points increases by moving down the particular levels; and
use an iterative Kmeans operation to dynamically vary the number of clusters in the hierarchy of the clusters to select the number of the plurality of clusters to be used in modeling the behaviors of the clusters.

20. The non-transitory computer-readable medium of claim 18, wherein the instructions further cause the processor to:
apply an expectation maximization operation onto the distribution types of the clusters to generate the mixture model.

* * * * *